US006978371B1

(12) United States Patent
Yu (10) Patent No.: US 6,978,371 B1
(45) Date of Patent: Dec. 20, 2005

(54) DATA HIDING IN DIGITAL MULTIMEDIA

(75) Inventor: Hong Heather Yu, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 683 days.

(21) Appl. No.: 09/707,697

(22) Filed: Nov. 7, 2000

(51) Int. Cl.[7] .............................................. H04L 9/00
(52) U.S. Cl. ..................................... 713/176; 382/248
(58) Field of Search ........................ 713/176; 382/100, 382/284, 248, 250; 370/431; 348/463, 380; 380/49, 279, 202

(56) References Cited

U.S. PATENT DOCUMENTS

| | | | | |
|---|---|---|---|---|
| 5,699,361 | A | * 12/1997 | Ding et al. | ................... 370/431 |
| 5,748,783 | A | 5/1998 | Rhoads | |
| 5,809,139 | A | 9/1998 | Girod et al. | |
| 5,848,155 | A | 12/1998 | Cox | |
| 5,862,260 | A | 1/1999 | Rhoads | |
| 5,893,067 | A | * 4/1999 | Bender et al. | ............... 704/502 |
| 5,905,800 | A | 5/1999 | Moskowitz et al. | |
| 5,905,819 | A | * 5/1999 | Daly | ........................... 382/284 |
| 5,915,027 | A | 6/1999 | Cox et al. | |
| 5,930,369 | A | 7/1999 | Cox et al. | |
| 5,963,909 | A | 10/1999 | Warren et al. | |
| 6,094,722 | A | * 7/2000 | Astola et al. | ................ 713/176 |
| 6,314,192 | B1 | * 11/2001 | Chen et al. | ................... 382/100 |
| 6,332,030 | B1 | * 12/2001 | Manjunath et al. | .......... 382/100 |
| 6,456,726 | B1 | * 9/2002 | Yu et al. | ....................... 382/100 |
| 6,466,209 | B1 | * 10/2002 | Bantum | ....................... 345/589 |
| 6,512,835 | B1 | * 1/2003 | Numao et al. | ............... 382/100 |

OTHER PUBLICATIONS

Bender et al., Techniques for Data Hiding, IBM Systems Journal, Feb. 1996, vol. 35, No. 3 & 4 (entire document).
Koch et al. Copyright Protection for Multimedia Data, ACM digital Library, Dec. 1984 (entire document).
Zhao, J., Applying Digital Watermarking Techniques to Online Multimedia Commerce, ACM Digital Library, CISSA 1997, Jun. 1997 (entire document).
Yu et al., Active Data Hiding for Secure Electronic Media Distribution, Panasonic Information and Networking Technology Lab, ACM Multimedia 1999, Nov. 1999 (entire document).

\* cited by examiner

*Primary Examiner*—Kim Vu
*Assistant Examiner*—Thanhnga Truong
(74) *Attorney, Agent, or Firm*—Harness, Dickey & Pierce, PLC (57) ABSTRACT

A method and system for hiding authentication data within a multimedia data stream provides for cross-authentication. The method includes the step of obtaining a first set of authentication data, where the first set of authentication data is based on data contained in a first media channel of the multimedia data stream. The method further includes the step of hiding the first set of authentication data in a second media channel of a multimedia data stream. When dealing with active data streams, the present invention provides for hiding a first subset of the active data stream in a visual channel of the multimedia data stream. A second subset of the active data stream is then hidden in the audio channel of the multimedia data stream. In one embodiment, the first subset includes executable content, where the second subset includes a controlled data stream.

30 Claims, 5 Drawing Sheets

DATA HIDING IN DIGITAL MULTIMEDIA

BACKGROUND OF THE INVENTION

1. Technical Field

The present invention relates generally to the authentication of multimedia data streams. More particularly, the present invention relates to the insertion of authentication data across media channels of a multimedia data stream.

2. Discussion

For as long as humans have communicated with one another, there has been significant concern over maintaining confidentiality. As a result, verbal, written, as well as electronic messages have historically been the subject of substantial technological efforts to maintain security. It is easy to understand that as the complexity of electronic messages (i.e. files/data streams) increases, so do the techniques for authenticating these messages. For example, electronic messages can have visual content (such as images or streams of images), audio content (such as .wav sound file data), textual content (such as word processing data), or any combination thereof. In recent years various authentication techniques for each of these "single" media have been explored. With the advent of multimedia, however, authentication concerns have continued. In some instances, these concerns have increased.

Multimedia data streams contain two or more media channels such as visual media channels, audio media channels, and text media channels. While certain data hiding techniques have been developed for media authentication when at least two forms of media are presented in a digital data stream, these techniques fail to fully address the type of data being authenticated.

Generally speaking, conventional digital data hiding schemes can be classified into two categories—robust data hiding and fragile data hiding. Robust data hiding provides a mechanism for fighting against common signal processing (or unintentional) attacks, as well as intentional attacks. This is done by making the hidden data immune to variations caused by signal processing or transmission errors.

Fragile data hiding, on the other hand, provides a mechanism for detecting variations made in the host medium such that the hidden data can manifest the originality of the host medium. In some applications, it can also be beneficial to identify the location of the variation in the host medium. In short, fragile data hiding may suffer from common signal processing attacks as well as intentional attacks. Thus, fragile data hiding is more commonly used for authentication purposes.

As already mentioned, media specific techniques for digital media such as digital color/gray scale images, plain text, and video have been studied by a number of researchers in recent years. Specifically, a number of approaches to fragile image watermarking have been developed. Furthermore, authentication of other media types such as video and text, with fragile data hiding, has often been considered to be a special case of image data hiding and studied accordingly. It is well known that one of the most important formats of media in e-distribution is video, which itself is a multimedia data stream containing visual, audio, and text channels. When video authentication is limited to a particular domain of image authentication, however, the strength and capability may be greatly limited or insufficient for certain applications. In light of the above, it is desirable to provide a fragile data hiding system for the purposes of multimedia authentication.

The above and other objectives are provided by a method for hiding authentication data within a multimedia data stream in accordance with the present invention. The multimedia data stream has at least two media channels. The method includes the step of obtaining a first set of authentication data, where the first set of authentication data is based on data contained in the first media channel. The method further includes the step of hiding the first set of authentication data in the second media channel. As already mentioned, one of the most important formats of media e-distribution is video, which itself is a multimedia data that contains visual, audio, as well as text data. Data hiding in all possible channels, as opposed to single medium/single channel hiding, yields higher data hiding capacity. More data hiding capacity also provides a higher level of controllability.

The benefits associated with using all possible media channels have two particularly important applications. The first application relates to the ability to optimize data hiding capacity based on data structures. For example, it is commonly known that visual data has much larger (several orders of magnitude) data hiding capacity than audio data. This is due to the human auditory system's incapability to tolerate (i.e., high sensitivity) additive random noise. On the other hand, plain text, which is often viewed as binary image data (i.e., visual medium) as well, is the most difficult type of media in which to embed hidden data. The low capacity of perceptual invisible noise induced by its binary nature makes it particularly difficult to insert any hidden data within a text channel. To reach a better transparency and capacity tradeoff, the unique unbalanced multimedia data structure is well utilized by inserting part or all of the authentication value obtained from the low capacity media channel and other necessary control data into the high capacity media channel, such as the visual data channel. For ease of discussion, video image frames will be referred to as visual data, and plain text data will be referred to as text data, unless otherwise specified.

A second important application relates to the ability to synchronize between channels. Specifically, hiding data in audio and visual channels as well as in text channels in synchronization can provide additional authentication capabilities. For example, the present invention allows for the determination of whether an audio track is a "fake" version of the video. It is also important to note that the reverse is true. The present invention, therefore, provides a solution to the cross verification problem. In other words, this enables the verification of whether a channel originated with the presumed channels (i.e. that it is an authentic channel of the original data).

It is important to note that such an efficient utilization of multimedia data structure for data hiding and the capability of cross verification are particularly useful when dealing with active data streams. For example, the present invention provides a method for hiding an active data stream within a multimedia stream having an audio channel and a visual channel. The method includes the step of hiding a first subset of the active data stream in the visual channel. The method further provides hiding a second subset of the active data stream in the audio channel. In one embodiment, the first subset includes executable content, where the second subset includes a controlled data stream.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENT

Figure 1:
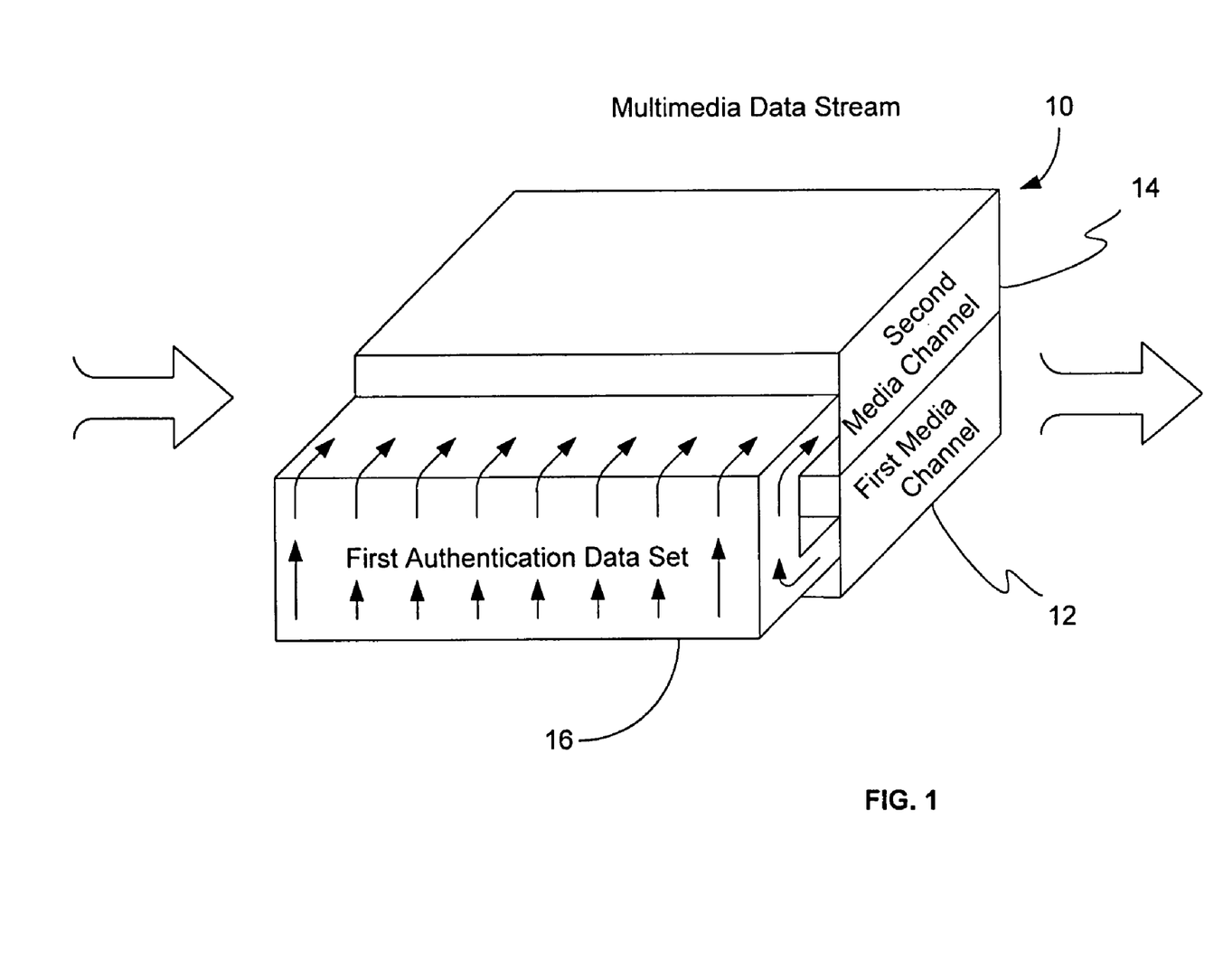
FIG. 1 is a three-dimensional diagram demonstrating the hiding of a first authentication data set in a second media channel, where the data set is based on data contained in a first media channel.

Turning now to FIG. 1, a multimedia data stream 10 having a first media channel 12 and a second media channel 14 in accordance with the present invention is shown. It will be appreciated that the multimedia data stream 10 can contain any type of media content, and is only required to have more than one media channel for the purposes of the present invention. As will be discussed in greater detail below, the number and types of channels in the data stream 10 can vary greatly depending upon the application. Nevertheless, in accordance with the present invention an authentication data set 16 is obtained, and is based on data contained in the first media channel 12.

It will further be appreciated that the authentication data set 16 can include any number of authentication data types. For example, the authentication data set 16 can include active data streams, identification marks, syncs, and other types of well-known authentication values. It can be further seen that authentication data set 16 is hidden in the second media channel 14. It will be appreciated that hiding authentication data across channels as shown in FIG. 1 is quite different from the self-authentication approach of conventional authentication schemes. For some applications, cross-authentication allows the optimization of data hiding capacity, and provides a mechanism for benefiting from the differences in data structures between media channels. Furthermore, more robust synchronized authentication between channels is possible under the present invention.

Figure 2:
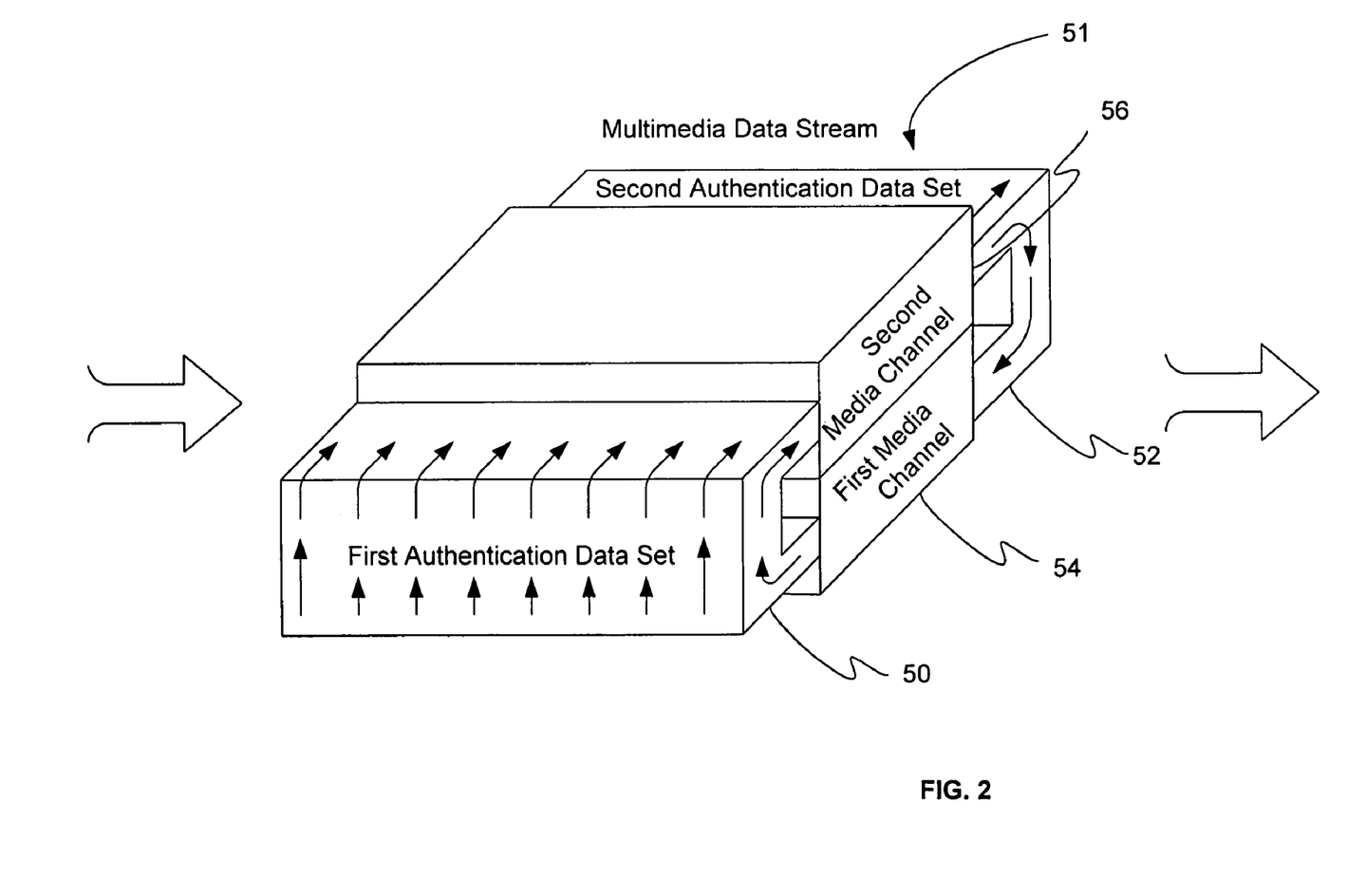
FIG. 2 is a three-dimensional diagram showing multi-layer data hiding in accordance with one embodiment of the present invention.

Turning now to FIG. 2, it can be seen that the above concept can be expanded to achieve reciprocating cross-authentication. Specifically, a second set of authentication data 52 is generated, where the second set of authentication data 52 is based on data contained in the second media channel 56. Embedding the second authentication data 52 in the first media channel 54 allows the media channels 56 and 54 to be checked against one another by the recipient of the multimedia data stream 51. Specifically, the first authentication set 50 (such as an audio ID) is hidden into the corresponding video segment of the second media channel (i.e., the visual channel). Similarly, the second authentication data set (such as the visual ID) is inserted back into the corresponding audio segment of the first media channel 54. This can be done by first calculating the one-way hash value of each data channel $h_i = H(D_i)$ and then mapping the hash value $h_i$ into the channel ID sequence $ID_i$, where $ID_i = f(h_i)$.

As will be discussed in greater detail below, variations in the source and destination of the authentication data, as well as variations in the type and number of authentication data sets, are possible. Multi-layer data hiding occurs when the authentication data sets are divided into subsets to improve efficiency.

Multi-Layer Data Hiding

Figure 3:
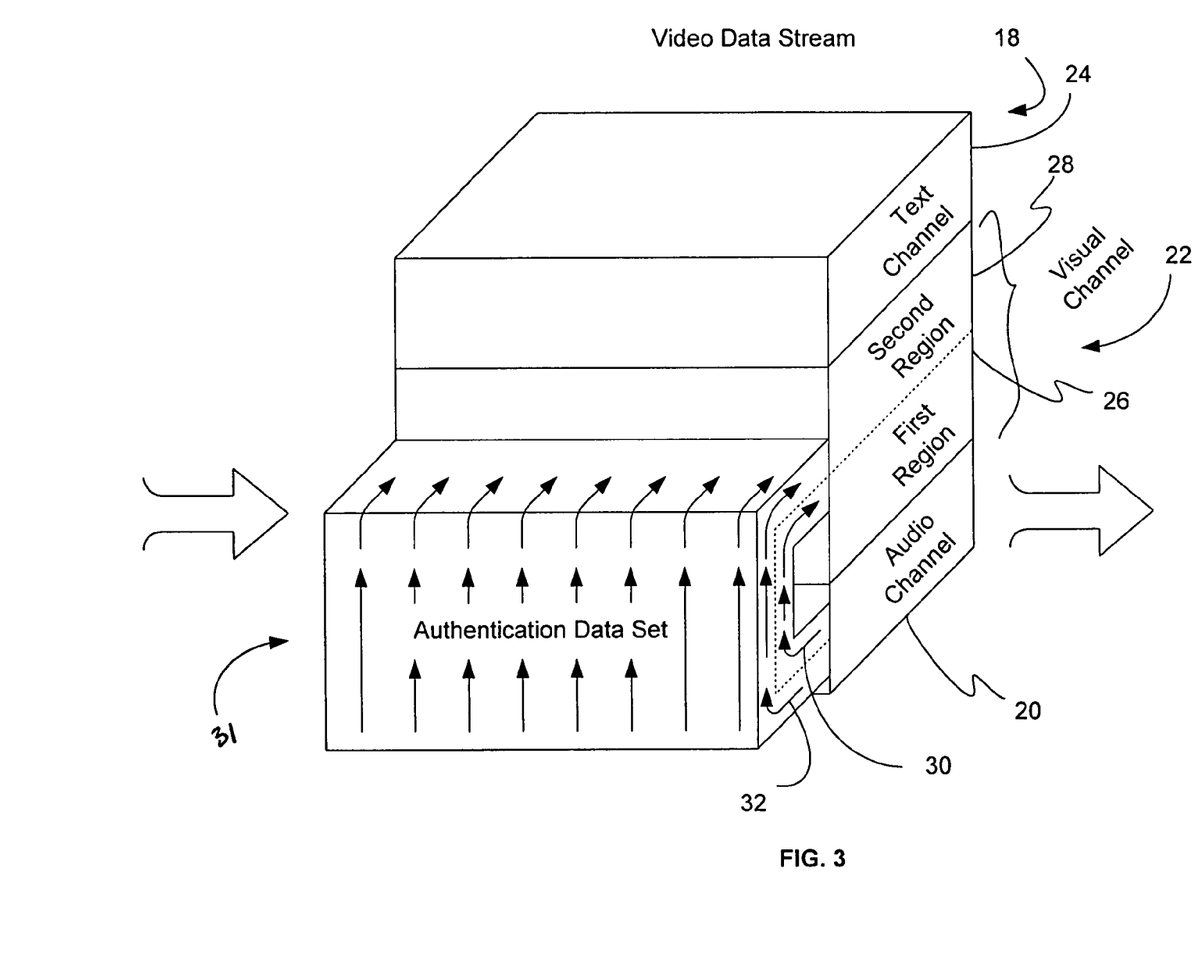
FIG. 3 is a three-dimensional diagram showing cross-authentication in accordance with a first alternative embodiment of the present invention.

Turning now to FIG. 3, one multi-layer data hiding approach is shown in greater detail. In this embodiment, a video data stream 18 has three channels—namely, an audio channel 20, a visual channel 22, and a text channel 24. It can further be seen that the visual channel 22 has a data structure that allows the visual channel 22 to be conceptually divided into a first region 26 and a second region 28.

At this point of the discussion, it is important to note that data hiding generally results in a tradeoff between capacity and transparency. Thus, as capacity is increased, hidden data loses transparency (i.e., becomes more visible); whereas when capacity is decreased, transparency increases (i.e. visibility of artifacts decreases).

The above tradeoff can best be dealt with in accordance with the present invention by capitalizing on the fact that certain regions of a given channel are more suitable for providing high data hiding capacity than other regions. By similarly distinguishing between types of authentication data, a much more efficient data hiding system can be achieved. Thus, the present invention defines a first subset 30 and a second subset 32 of the authentication data 34. The first subset 30 is hidden in the first region 26 of the visual channel 22, where the first region 26 has an associated data hiding capacity. The first region 26 is therefore known to be suitable for hiding the first subset 30. The second subset 32, on the other hand, is hidden in the second region 28. The second region 28 has an associated data hiding capacity which may be greater or less than that of the first region 26 depending on the data structure of the visual channel 22. Nevertheless, the second region 26 is known to be suitable for hiding the second subset 32.

It will be appreciated that typical multimedia data streams such as the video data stream 18 contain audio, visual, as well as text data. The following discussion will use several types of video data streams as examples to illustrate the effectiveness of the present invention with respect to different quality requirements and capacities across media channels.

Figure 4:
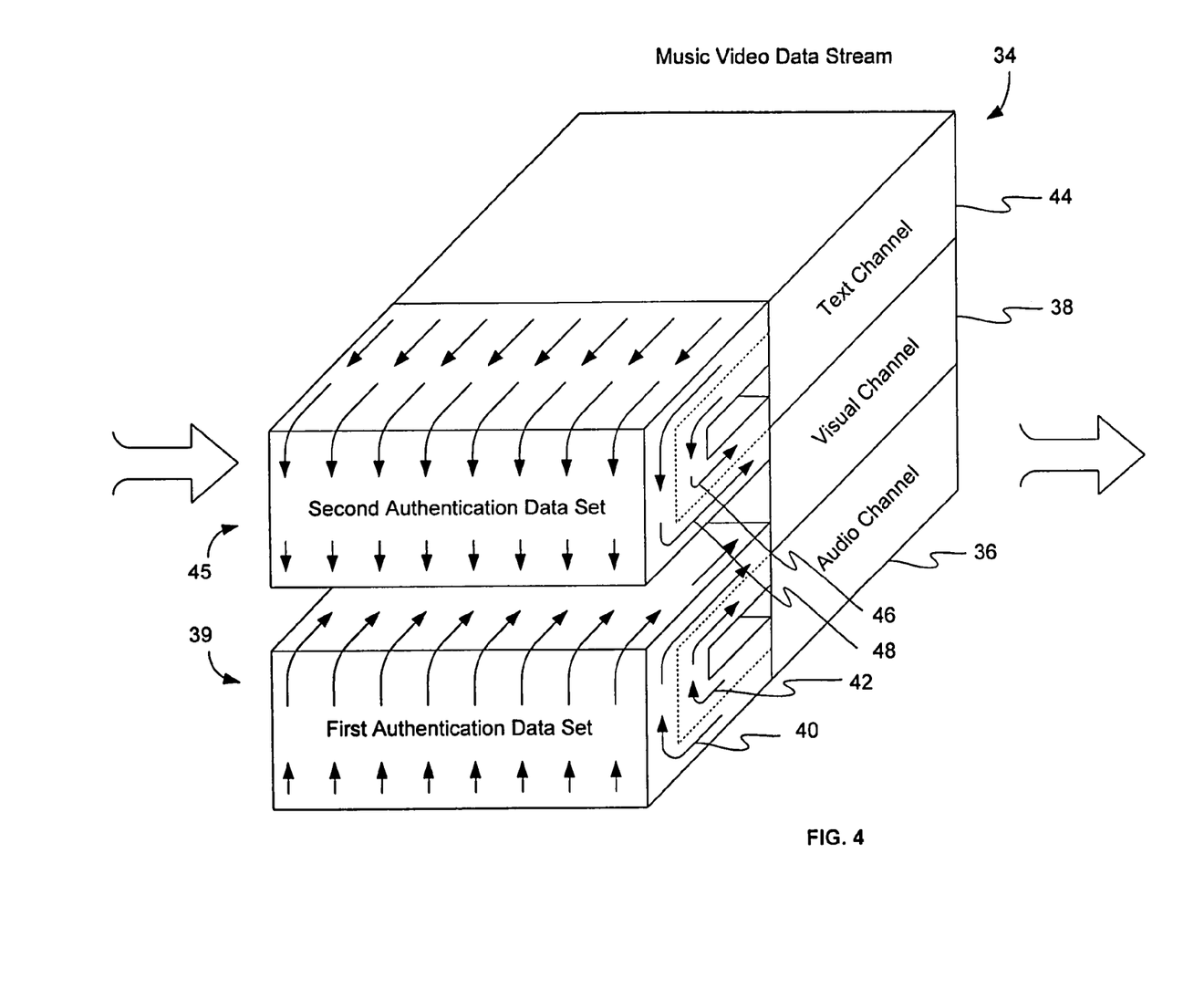
FIG. 4 is a block diagram showing cross-authentication in accordance with a second alternative embodiment of the present invention.

Turning now to FIG. 4, suppose that the data stream 34 is a music video in which sound is of primary importance. Thus, minimal degradation (i.e., high transparency) within the audio channel 36 is most desirable, whereas the visual channel 38 is able to tolerate more noise (i.e., high capacity). This is largely due to the fact that music video sequences usually consist of relatively short "shots", which means that there is a very high shot transition rate. Thus, certain artifacts that are visible in still images may be tolerable in music video sequences because the human eye does not have time to focus on the artifacts. This means that with respect to the first authentication data set 39, the visual channel 38 should receive the subset 40 of the authentication data that requires high capacity. The audio channel 36, on the other hand, should receive the subset 42 of the authentication data that can be inserted into high transparency regions. With respect to the second authentication data set 45, it will be appreciated that the text channel 44 is very similar to the audio channel 36. This is because the high transparency subset 46 goes into the text channel 44, whereas high capacity subset 48 goes into visual channel 38. Thus, only subsets 46 and 42 (i.e., self-authentication values) are inserted into the text channel 44 and the audio channel 36, while the subsets 40 and 48 (i.e., remaining primary hidden data) are embedded into the visual channel 38. The primary hidden data can include data such as active data streams, access control bits, self-authentication values for the visual channel 38, and cross-authentication values from the other channels 36 and 44. Furthermore, as we described in FIG. 3 (and also in greater detail in U.S. patent application Ser. No. 09/427,321, filed Oct. 26, 1999 and entitled "Methods and Apparatus for Multi-Layer Data Hiding") the active data stream can be inserted into the high capacity region of visual channel while the other control data are embedded into the high robustney region of visual channel. The result is a multimedia data stream that is able to provide an optimal capacity/transparency tradeoff with respect to authentication.

Another example (not shown) is video karaoke where the audio channel may have different regions operating in different modes. In this case, cross verification and synchronization is quite important. However, hiding primary hidden data, such as the JAVA agent, across all the regions in the audio channel may not be a wise choice. For example, suppose a particular region (e.g., channel six) of the audio channel contains the voice data where the original singer's voice track is recorded. If part of the primary hidden data is embedded in this region, proper extraction of this data will fail when the original singer's voice track is turned off. This is also true for other types of authentication data such as authentication values.

Another example (not shown) is where the multimedia data stream represents video surveillance footage. Unlike music videos and video karaoke, surveillance video typically does not have closed caption (text) data, and the shot transition rate can be as low as zero. Furthermore, when dealing with surveillance video it is extremely important to have high visual and audio quality for the purposes of identification. This requirement makes high capacity data hiding particularly difficult. This is especially true for linear high capacity data hiding. In this case, the difficulty may be lessened by considering whether the audio and visual data has equal importance. The same is true for cross verification versus self-verification. Other examples where the present invention is particularly useful include video commercials where the duration of the video can be as short as a few seconds. In this case, the capability to explore as much data hiding capacity as possible becomes extremely important.

When large data hiding capacity is available (for example, in the visual data channel) as in the case of an hour-long movie, the problem is relatively easy in comparison to other cases. This is especially true when real time decoding is not required. A straightforward approach is simply to embed the primary active hiding data into the high capacity visual data channel, with some of the control data embedded into the high robustness region of the visual channel. Then, a sync (to be described in greater detail below), such as an authentication value or an identification mark, can be hidden in every channel of the multimedia data stream in a synchronized fashion. If, for example, the audio channel is changed or entirely replaced, the authentication check will fail at the recipient.

Synchronization

While the above discussion has been largely directed to achieving a desired capacity/transparency tradeoff by subdividing authentication data times and data hiding regions, the present invention also has other important aspects. Specifically, by properly selecting the source of the authentication data and the destination of the authentication data, unique synchronization opportunities arise under the present invention.

Figure 5:
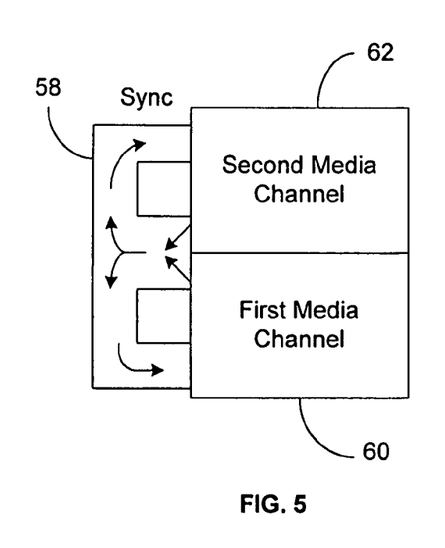
FIG. 5 is a block diagram showing cross-authentication in accordance with a third alternative embodiment of the present invention.
Figure 6:
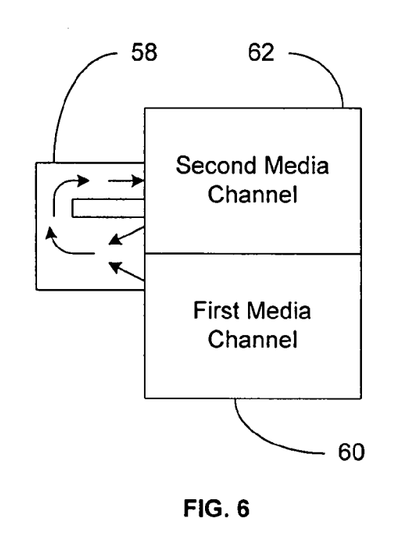
FIG. 6 is a block diagram showing cross-authentication in accordance with a fourth alternative embodiment of the present invention.

Turning now to FIG. 5, another embodiment of the present invention is shown in greater detail. In this embodiment, a sync 58 is generated based on both the first media channel 60 and the second media channel 62. In the case of three media channels, the equation would be ID=f (Vs, As, Ts), with Vs, As, Ts representing the visual, audio, and text media channels, respectively. The same sync 58 is then inserted into each and every channel 60, and 62. FIG. 6 shows the sync 58 only being inserted into the second media channel 62.

While the present invention has primarily discussed cross-authentication, self-authentication is also possible. Because of our high capacity assumption in this case, another level of verification may be added with self-authentication. To ensure self-authentication (i.e., in the event that one or more of the media channels are missing, the authenticity of the remaining channel itself can still be verified), a self authentication is performed on each and every medium itself and the authentication value is inserted back.

Active Data Hiding

Figure 7:
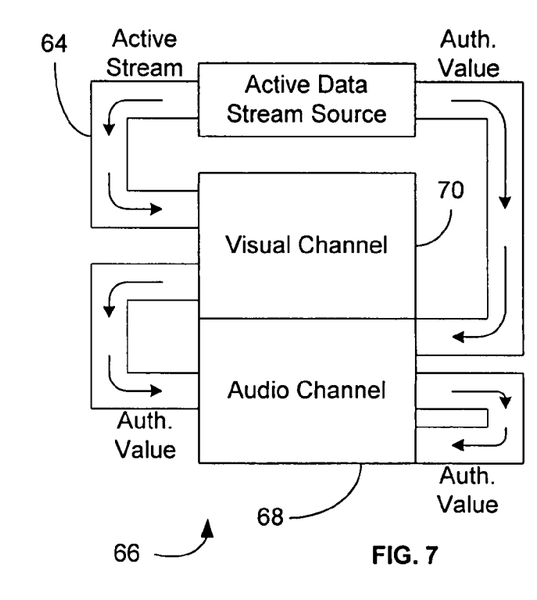
FIG. 7 is a block diagram showing cross-authentication in accordance with a fifth alternative embodiment of the present invention.

Turning now to FIG. 7, it will be further appreciated that the present invention also provides for hiding an active data stream 64 within a multimedia data stream 66 having an audio channel 68 and a visual channel 70. For further details regarding active data hiding, in general, see U.S. patent application Ser. No. 09/425,592, filed Oct. 22, 1999 and entitled "Active Data Hiding for Secure Electronic Media Distribution".

In order to encode and decode, the present invention uses a three-pass architecture. First, the meaningful active agent data stream S is mapped into a sequence of binary data $Sb=Sb_1, Sb_e, \ldots Sb_M$ of length M which are inserted imperceptibly into the host signal I. Then, the control data, active stream authentication value, $E=E_1, E_2, \ldots E_Q$, are generated and embedded into the host signal in the second pass. This authentication value is designed in such a way that it also can be used as error correction bits. In the third pass, cryptography techniques are used to authenticate the host signal with both the cross-authentication and self-authentication. Notice that the host signal may be authenticated together with the embedded hidden agent, if preferable.

The high robustness requirement makes it suitable to embed the error correction data layer into the high robustness data hiding region. According to our study, spread spectrum algorithms provides relative high robustness when the mid-band of block-based DCT coefficients are used. However, spread spectrum schemes can only provide lower data hiding capacity. Therefore, the smaller the error correction sequence is, the more desirable it is. One simple way is to use 2D or multi-D checksum error correction. Assume the error correction bit number is Q and the active data stream bit number is M. Then in the case of 2D checksum, the error correction stream length (number of bits) satisfies $M=(Q/2)^2$. For instance, our Java agent, JA, has a data stream length of 4000 bits. The error correction bits needed for JA is thus only $64 \times 2 \approx 128$ bits in the case of 2D checksum.

Below the 2D checksum algorithm is given.

Encoding

Let Q=ceiling $[2M^{1/2}]$, i.e., let Q be the smallest integer which is no less than $(2M^{1/2})$.

Arrange $Sb=Sb_1, Sb_2, \ldots Sb_M$ into Q/2 chucks
$SB(1)=SB(1)_1, SB(1)_2, SB(1)_{Q/2}=Sb_1, Sb_2, \ldots$
$Sb_{Q/2}, SB(2)=SB(2)_1, SB(2)_2, SB(2)_{Q/2}= Sb_{Q/2+1}, \ldots$
$Sb_Q \ldots$ and $SB(Q/2)=SB(Q/2)_1,$
$SB(Q/2)_2 \ldots SB(Q/2)_{Q/2}=Sb_{(QQ-2Q)/4+1}, \ldots Sb_M$ Let $E_q=LSB(SB(q)_1+SB(q)_2+ \ldots +SB(q)_{Q/2})$ for $q\in(1, Q/2)$ and $Eq=LSB (SB(1)_q+SB(2)_q+ \ldots +SB(Q/2)_q)$ for $q\in(Q/2, Q)$, where LSB (S)

denotes the least significant bit of S.

Use spread spectrum data hiding to hide $E_q$ into the high robustness data hiding region.

Decoding can be similarly done as in encoding process. We can use an authentication scheme similar to that of [9] in which they suggested to place the authentication value into the least significant bit of each sample.

A brief outline of the algorithm is described below with audio as an example.

Choose verification block size B and dependent block size D (for example, B=128 & D=512 bits). Assume the host signal is a 16 bits audio, concatenating all the high bits (all the bits except the least significant bit) of the 512 samples yields a message Mb of $15 \times 512 = 7680$ bits. Now by further concatenating a key of 512 bits (or a key of shorter length which is padded to 512 bits), a message MB of 8192 bits is produced.

Compute the one way hash with the MD5 algorithm, MB'=h=H(MB), to generate a 128 bits message MB'. (Append time, host signal length, and/or owner information, if B>128 bits.)

Use public key (or secret key, depends on different applications) cryptography method and signing MB' with secret key K, MB''=Sgn(K, MB').

Insert the B bits message MB'' into the least significant bit of each sample, from $1 \rightarrow 0$ if embedding 0 or $0 \rightarrow 1$ if embedding 1, into the verification block.

With marginal data hiding capacity, the aim is to reach the optimum transparency-capacity-robustness tradeoff. Therefore to hide embedding data into all possible channels of the multimedia is expected. As we discussed earlier, for higher decoding accuracy and controllability, error correction bits and other control bits may be generated and embedded into the host data in addition to the primary hidden data. One way is to hide the control bits into the audio channel and the primary hidden data (active data stream) into the visual data channel since the primary hidden data stream is anticipated to be much larger than the secondary (control) data stream. This is based on the observation that visual data often provides a much higher data hiding capacity, maybe several orders higher, than the audio data. Another way is to hide the secondary hidden data, such as error correction bits and access control bits into the high robustness region of visual data. The primary hidden data can be embedded into the high robustness region of visual data. The primary hidden data can be embedded into the rest parts of the multimedia data, which include the high capacity region of visual data, audio data, and text data. The difference lies in where the active data stream sits. In this case, to reach the optimum robustness and capacity tradeoff for data hiding, the active data stream may be embedded across visual and audio data channels. On the contrary, when host media authentication is the only goal while audio data channel has low data hiding capacity, we may very well hide the authentication value of part or all of audio and text data into the visual data channel for optimum performance. In summary, the design of multimedia data hiding scheme based on the robustness/capacity requirement of each kind of hidden data is likely to give a better tradeoff for many applications.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed:

1. A method for hiding authentication data within a multimedia data stream having a first media channel and a second media channel, the method comprising the steps of:
   obtaining a first set of authentication data;
   said first set of authentication data being based on data contained in the first media channel;
   obtaining a second set of authentication data;
   said second set of authentication data being based on data contained in the second media channel;
   hiding the first set of authentication data in the first media channel and the second media channel; and
   hiding the second authentication data in the first media channel and the second media channel,
   wherein an active data stream is inserted into a high capacity region of a visual channel, while other control data are embedded into a relatively high robustness region of the visual channel, the high capacity region having higher capacity and lower robustness than the high robustness region.

2. The method of claim 1 further including the steps of:
   defining a first subset of authentication data;
   hiding the first subset in a first region of the second media channel, the first region having a first data hiding capacity;
   defining a second subset of authentication data; and
   hiding the second subset in a second region of the second media channel, the second region having a second data hiding capacity.

3. The method of claim 1 further including the step of generating an identification mark for the first media channel based on a signature of the first media channel, the identification mark defining the first set of authentication data and enabling synchronization between the first media channel and the second media channel.

4. The method of claim 1 further including the step of generating an authentication value for the first media channel, the authentication value defining the first set of authentication data.

5. The method of claim 4 further including the steps of:
calculating a one way hash value for the first media channel; and
mapping the hash value onto an identification mark for the first media channel.

6. The method of claim 1 further including the step of obtaining an active data stream, the active data stream having executable content and defining the first set of authentication data.

7. The method of claim 6 further including the step of obtaining a control data stream, the control data stream further defining the first set of authentication data.

8. The method of claim 7 further including the step of using two-dimensional checksum error correction to generate the first set of authentication data.

9. The method of claim 7 further including the step of using multi-dimensional checksum error correction to generate the first set of authentication data.

10. The method of claim 1 further including the step of generating the first set of authentication data based on data contained in the second media channel.

11. The method of claim 10 further including the step of embedding the first set of authentication data in the first media channel.

12. The method of claim 1 wherein the multimedia data stream has a third media channel, the method further including the step of hiding the first set of authentication data in the third media channel.

13. The method of claim 1, wherein the multimedia data stream has a third data channel, the method further including the steps of:
obtaining a third set of authentication data;
said third set of authentication data being based on data contained in the third media channel;
hiding the third set of authentication data in the first media channel and the second media channel; and
hiding the first set of authentication data and the second set of authentication data in the third media channel.

14. The method of claim 13, wherein the multimedia data stream is a video data stream, the first data channel is a video channel, the second data channel is an audio channel, and the third data channel is a text channel, the method further comprising the step of synchronously hiding authentication data obtained from each data channel of the multimedia data stream in every other data channel of the multimedia data stream.

15. The method of claim 1, further comprising the step of synchronously hiding authentication data obtained from all data channels of the multimedia data stream in every, individual data channel of the multimedia data stream.

16. A method for hiding authentication data within a multimedia data stream having a first media channel, a second media channel, and a third media channel, the method comprising the steps of:
obtaining a first set of authentication data;
said first set of authentication data being based on data contained in the first media channel;
obtaining a second set of authentication data;
said second set of authentication data being based on data contained in the second media channel;
obtaining a third set of authentication data;
said third set of authentication data being based on data contained in the third media channel;
hiding the first set of authentication data in the second media channel;
hiding the second set of authentication data in the first media channel;
hiding the third set of authentication data in the first media channel and the second media channel; and
hiding the first set of authentication data and the second set of authentication data in the third media channel,
wherein an active data stream is inserted into a high capacity region of a visual channel, while other control data are embedded into a relatively high robustness region of the visual channel, the high capacity region having higher capacity and lower robustness than the high robustness region.

17. The method of claim 16, wherein the multimedia data stream is a video data stream, the first data channel is a video channel, the second data channel is an audio channel, and the third data channel is a text channel, the method further comprising the step of synchronously hiding authentication data obtained from each data channel of the multimedia data stream in every other data channel of the multimedia data stream.

18. The method of claim 16, further comprising the step of synchronously hiding authentication data obtained from all data channels of the multimedia data stream in every, individual data channel of the multimedia data stream.

19. The method of claim 16, further including the steps of:
defining a first subset of authentication data;
hiding the first subset in a first region of the second media channel, the first region having a first data hiding capacity;
defining a second subset of authentication data; and
hiding the second subset in a second region of the second media channel, the second region having a second data hiding capacity.

20. The method of claim 16 further including the step of generating an identification mark for the first media channel based on a signature of the first media channel, the identification mark defining the first set of authentication data and enabling synchronization between the first media channel and the second media channel.

21. The method of claim 16 further including the step of generating an authentication value for the first media channel, the authentication value defining the first set of authentication data.

22. The method of claim 21 further including the steps of:
calculating a one way hash value for the first media channel; and
mapping the hash value onto an identification mark for the first media channel.

23. The method of claim 16 further including the step of obtaining an active data stream, the active data stream having executable content and defining the first set of authentication data.

24. The method of claim 23 further including the step of obtaining a control data stream, the control data stream further defining the first set of authentication data.

25. The method of claim 24 further including the step of using two-dimensional checksum error correction to generate the first set of authentication data.

26. The method of claim 24 further including the step of using multi-dimensional checksum error correction to generate the first set of authentication data.

27. The method of claim 16 further including the step of generating the first set of authentication data based on data contained in the second media channel.

28. The method of claim 27 further including the step of embedding the first set of authentication data in the first media channel.

29. The method of claim 16 wherein the multimedia data stream has a third media channel, the method further including the step of hiding the first set of authentication data in the third media channel.

30. A method for hiding authentication data within a multimedia data stream having a first media channel and a second media channel, the method comprising the steps of:
- obtaining a first set of authentication data;
- said first set of authentication data being based on data contained in the first media channel;
- obtaining a second set of authentication data;
- said second set of authentication data being based on data contained in the second media channel;
- hiding the first set of authentication data in the first media channel and the second media channel;
- hiding the second authentication data in the first media channel and the second media channel; and
- synchronously hiding authentication data obtained from all data channels of the multimedia data stream in every, individual data channel of the multimedia data stream,
- wherein an active data stream is inserted into a high capacity region of a visual channel, while other control data are embedded into a relatively high robustness region of the visual channel, the high capacity region having higher capacity and lower robustness than the high robustness region.

\* \* \* \* \*